United States Patent [19]

Tuzson

[11] 4,232,770
[45] Nov. 11, 1980

[54] DRIVE COUPLING

[75] Inventor: John J. Tuzson, Evanston, Ill.

[73] Assignee: Borg-Warner Corporation, Chicago, Ill.

[21] Appl. No.: 957,788

[22] Filed: Nov. 6, 1978

[51] Int. Cl.³ .............................................. F16D 23/14
[52] U.S. Cl. ................................ 192/41 R; 192/93 A
[58] Field of Search ................ 192/93 R, 93 A, 41 R, 192/31, 92, 101, 35, 48.92

[56] References Cited

U.S. PATENT DOCUMENTS

| | | | |
|---|---|---|---|
| 1,114,716 | 10/1914 | Annable | 192/31 |
| 1,593,732 | 7/1926 | Street | 192/41 R X |
| 2,061,220 | 11/1936 | Cotterman | 192/46 |
| 3,217,847 | 11/1965 | Petrak | 192/93 A X |
| 3,477,302 | 11/1969 | Webb | 192/41 R X |
| 3,651,906 | 3/1972 | Slator et al. | 192/93 A X |
| 3,656,598 | 4/1972 | Goble | 192/35 |
| 4,022,308 | 5/1977 | Hurst | 192/21 |

FOREIGN PATENT DOCUMENTS 1036394  9/1953  France .................................. 192/41 R

*Primary Examiner*—Rodney H. Bonck
*Attorney, Agent, or Firm*—Aubrey L. Burgess

[57] ABSTRACT

A drive coupling between a pair of shafts transmitting torque when the driving shaft is rotated in one direction and for selectively disengaging the shafts when the driving shaft is rotated in the opposite direction. The coupling comprises a two-part clutch, a first part of which is connected to the driven shaft and the second part of which is connected to the driving shaft. The latter has a cylindrical sleeve which surrounds a cam sleeve connected to the driving shaft with a cam groove engaged by a follower means connected to the clutch sleeve. The cam groove is shaped to provide two cam positions, i.e., one for the coupled drive and the other for disengaging the drive. Means are provided to lock the second part of the clutch against rotation to change the position of the follower for decoupling the shafts upon reverse rotation of the driving shaft.

A remotely operated coupling constructed as before mentioned provides a convenient means for coupling and uncoupling pump stages in a submersible pump thus permitting adjustment of the performance of the pump by the addition or subtraction of pump stages. This can be conveniently accomplished without pulling the entire assembly from the well.

4 Claims, 4 Drawing Figures

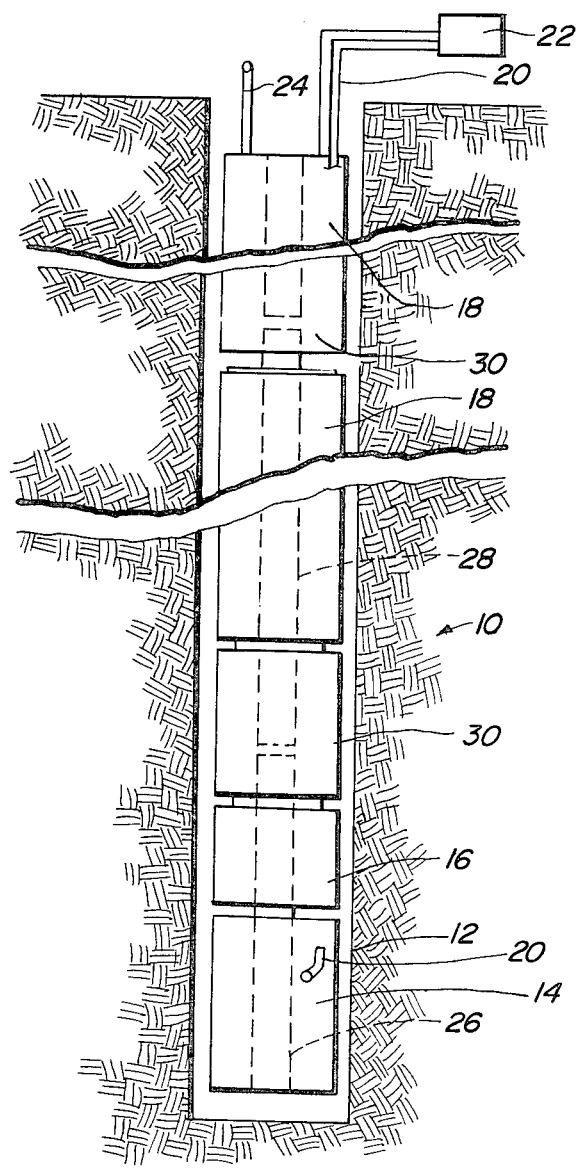
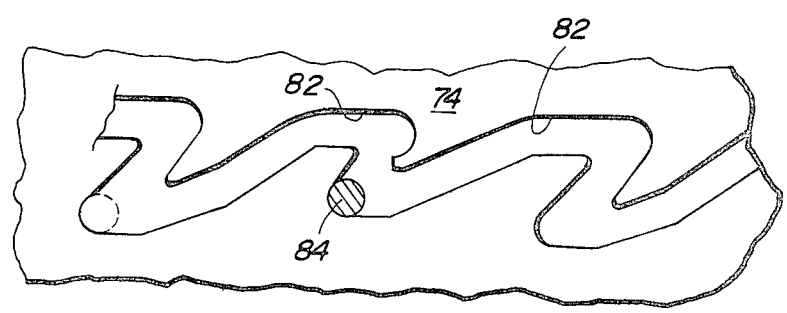

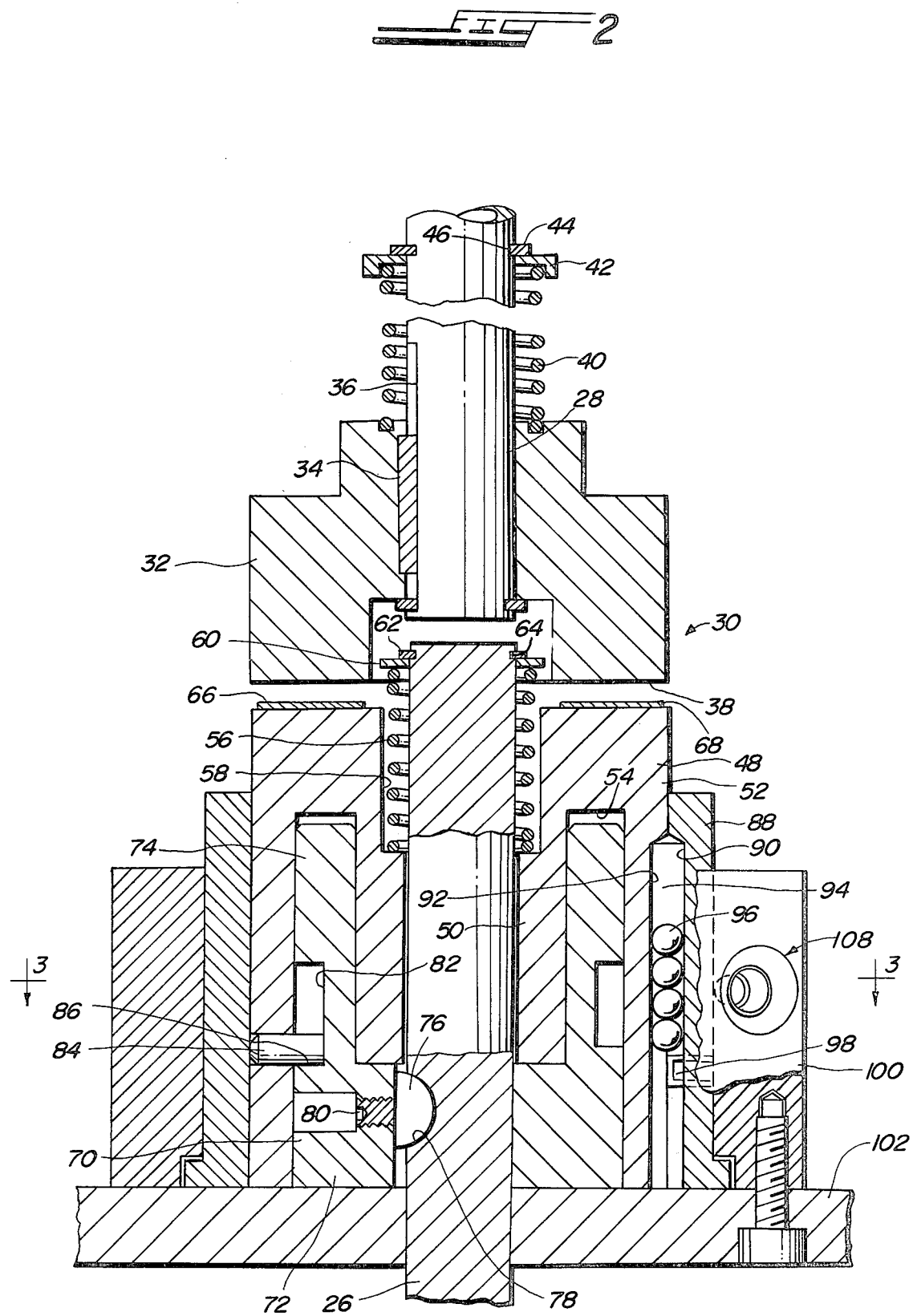

DRIVE COUPLING

BACKGROUND OF THE INVENTION

A submersible pump especially for use in deep wells, either water or oil, comprises an electric motor and a plurality of pump stages, the motor being lowermost and separated from the pump stages by a seal section to substantially prevent well fluid leakage into the motor housing. At times there are a hundred or more pump stages and the electric motor may be some thirty feet in length with a diameter of approximately six inches. In order to change the pumping performance, pump stages can be added or subtracted from the assembly, generally requiring pulling the assembly from the well. This is not only time consuming and costly but is also inconvenient.

THE INVENTION

A drive coupling which is especially adaptable for use in a submersible pump assembly for selectively connecting and disconnecting driving and driven shafts which can be remotely operated is herein described. Disconnecting the shafts is accomplished by reversing the direction of rotation of the driving shaft.

The drive coupling of this invention comprises a two-part clutch, a first part of which is connected to the driven shaft and the second part of which is connected to the driving shaft. The latter has a cylindrical sleeve which surrounds a cam sleeve connected to the driving shaft with a cam groove engaged by follower means connected to the clutch sleeve. The cam groove is shaped to provide two cam positions; i.e., one for the coupled drive in which the shafts are drivingly connected and the other for disengaging the drive in which the shafts are disconnected. Means, such as a one-way clutch are provided for locking the second part of the drive clutch against rotation in the reverse direction which changes the position of the cam follower and disconnects the shafts when the driving shaft is reversely rotated.

THE DRAWINGS

FIG. 1 is a schematic illustration of a submersible pump assembly showing the location of the drive coupling of this invention;

FIG. 2 is a partial sectional view of the drive coupling of this invention in uncoupled position;

FIG. 4 is a developed illustration of the cam usable in the coupling of FIG. 2.

DETAILED DESCRIPTION

Figure 3:
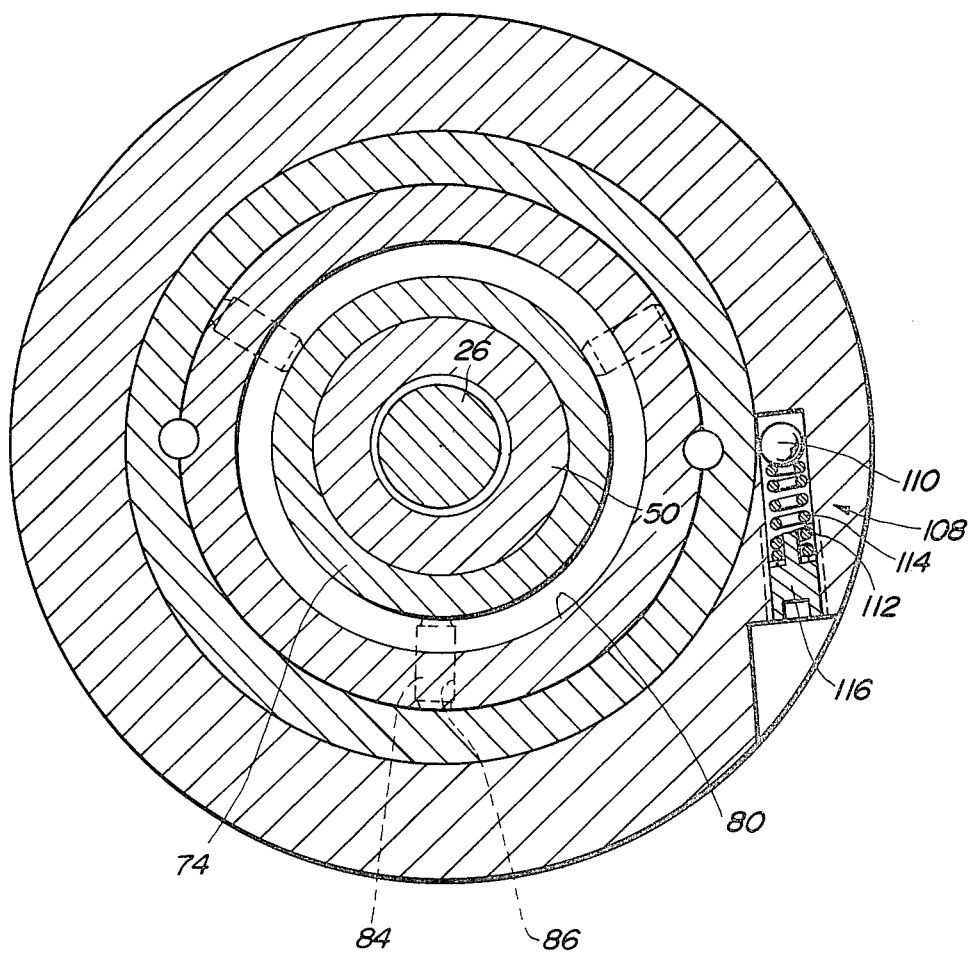
FIG. 3 is a sectional view taken on line 3—3 of FIG. 2 looking in the direction of the arrows.

Attention is now invited to the drawings and especially FIG. 1 which illustrates schematically the usual arrangement of a submersible pump assembly 10 in a well casing 12. The pump assembly 10 includes an electric motor 14, a seal section 16 and a pumping section 18. The motor is energized by an electric cable schematically illustrated at 20 and controlled from a control panel 22. The pumping section 18 generally comprises one or more pumping stages each comprising a diffuser and an impeller, the construction of which is not illustrated in detail because of its conventional construction. The pumping section discharges at 24.

The driving shaft is shown as the motor shaft and portions of pump stage shafts identified as 26 while the driven shaft is shown as 28. A coupling 30 according to this invention is located in the assembly generally between groups of pump stages.

Attention is now invited to FIGS. 2, 3 and 4 wherein the coupling 30 is illustrated in detail. The coupling 30 comprises a first part 32 connected to the driven shaft 28 by means of a key 34 received in keyway 36 in the shaft 28. The coupling part 32 has a bottom annular surface 38 and is capable of limited vertical movement. It is resiliently urged downwardly by a coil spring 40 surrounding the shaft 28 and retained by a spring retainer 42 surrounding the shaft 28 and located by a snap ring 44 in a groove 46 in the shaft 28.

The coupling 30 also comprises a second part 48 having a sleeve 50 surrounding the driving shaft 26 and a cup flange 52 spaced from the sleeve 50 thus defining an annular cavity 54. The part 48 is resiliently urged downwardly by a coil spring 56 received in a cavity 58 and positioned by a retainer 60 located by a snap ring 62 received in a groove 64 in the driving shaft 26. The part 48 has an upper annular surface 66 with an annular friction material 68 thereon for mating with the surface 38 of the first coupling part 32. The clutches can be constructed with engaging teeth, jaws or other configurations, without departing from the spirit of the invention.

A generally cup-shaped cam member 70 has a portion 72 surrounding the shaft 26 and an annular sleeve portion 74 received in the cavity 54. The member 70 is connected to the shaft 26 by a key 76 received in a keyway 78 and a set screw 80, as illustrated.

A cam groove 82 is formed in the sleeve 74 (see especially the developed illustration FIG. 4) which has coupled-drive positions and uncoupled positions. One or more follower pins 84 retained in suitable openings 86 in the cup flange 52 are received in the cam groove 82.

A cylindrical member 88 surrounds the cup flange 52 and is formed with one or more semi-circular grooves 90 which, with semi-circular grooves 92 in the cup flange 52, define blind circular openings 94 to receive one or more balls 96 retained in the openings 94 by a pin 98. This construction permits axial movement of the cup flange 52 relative to the member 88.

A cylindrical outer part 100 surrounds the member 88 and is bolted to a housing part 102 through which the shaft 26 passes.

The outer part 100 contains one or more (generally two) one-way clutches 108 each comprising a ball 110 received in an opening 112, the ball 110 being in contact with the outer surface of the cup flange 52 and being spring urged toward the flange by a coil spring 114. An adjustment screw 116 is provided to adjust the spring force.

When the motor 14 is operational and the driving shaft 26 is rotating (clockwise as viewed in FIG. 3), the clutch parts 32 and 48 are in engagement and the clutch 108 overrides, such that the pins 84 ride in the coupled-drive positions (see FIG. 4). Upon reversal of the direction of rotation of the driving shaft 26 through the control panel 22, the one-way clutch 108 engages the part 88 and the flange 52 which are coupled by the balls 96 causing the pins 84 to follow the cam grooves 82.

When it is desirable to decouple the shafts, the motor can be stopped, and then the current to the motor is reversed through the control panel 22 which will result in at least temporary rotation of the motor shaft 26 in the opposite direction. During uncoupling, the part 48 vertically moves the part 32, this being permitted by the spring 40.

Further, reverse rotation of the motor shaft is prevented by the cam groove configuration and the pins 84 move to the uncoupled positions. At this time, the motor should be stopped for restart in the drive condition and the shafts 26, 28 are uncoupled. The driving shaft 26 can rotate in the normal drive direction when the pins 84 are in the uncoupled position; however, the shafts 26, 28 are uncoupled.

With the drive uncoupled, the uncoupled pump states are removed and replaced.

Starting with the drive uncoupled, reversal of driving shaft rotation causes the pins 84 to ride in the cam groove 82 from the uncoupled positions to the next coupled positions thus recoupling the shafts 26, 28.

As readily understood, the driving shaft can be a motor shaft or a combination of two or more sections of shafts without departing from the spirit of the invention.

I claim:

1. An apparatus for drivingly connecting a driving shaft and a driven shaft comprising clutch means operatively associated with said shafts and means to actuate said clutch means, the improvement which comprises:
   a first clutch member connected to said driven shaft for rotation therewith;
   a second clutch member surrounding said driving shaft;
   cam means connected for rotation with said driving shaft;
   cam follower means connected to said second clutch member;
   said cam follower having at least two positions with respect to said cam, one of which corresponds to coupled shafts and the other of which corresponds to uncoupled shafts; and
   means to selectively actuate said cam and follower means comprising a one-way clutch associated with said second clutch member and providing a drag on said second clutch member upon reversal of the direction of rotation of said driving shaft thereby causing said cam follower to move from one cam position to another cam position.

2. In apparatus as recited in claim 1 further comprising spring means axially urging said first clutch member toward said second clutch member.

3. In apparatus as recited in claim 1 further comprising spring means for applying an axial force on said cam follower insuring cam engagement.

4. In a submersible pump-motor assembly wherein a driving shaft and a driven shaft are drivingly connected, the improvement which comprises:
   clutch means for drivingly coupling and uncoupling said shafts, said clutch means comprising a first part and a second part adapted to be engaged, said first part being rotatably connected to said driven shaft, said second part surrounding said driving shaft, cam means rotatably connected to said driving shaft and having at least two zones corresponding respectively to coupled and uncoupled shafts, a cam follower connected to said second clutch part such that when the follower is located at the cam uncoupled zone, the shafts are uncoupled and means to move said cam follower from one cam zone to another to couple and uncouple said shafts comprising one-way clutch means associated with said second clutch part and providing a drag on said second clutch part upon reversal of the direction of rotation of said driving shaft thereby causing said cam follower to move from one cam zone to another cam zone.

* * * * *